United States Patent [19]

Piano

[11] 4,405,173

[45] Sep. 20, 1983

[54] MOTOR VEHICLE DOOR ASSEMBLY

[75] Inventor: Renzo Piano, Paris, France

[73] Assignee: Fiat Auto S.p.A., Turin, Italy

[21] Appl. No.: 263,135

[22] Filed: May 13, 1981

[30] Foreign Application Priority Data

May 20, 1980 [IT] Italy .................... 67795 A/80

[51] Int. Cl.³ .............................................. B60J 5/00
[52] U.S. Cl. ..................................... 296/146; 49/381
[58] Field of Search .............. 296/146, 147, 148, 150; 49/381, 394; 160/DIG. 2

[56] References Cited

U.S. PATENT DOCUMENTS 3,035,863  5/1962  Hottle .................................. 296/146

Primary Examiner—Richard A. Bertsch
Attorney, Agent, or Firm—Merriam, Marshall & Bicknell

[57] ABSTRACT

The door assembly comprises a frame provided with at least three vertical rods and two longitudinal side members, superimposable sideways on a side of the carrying structure of the motor vehicle; said frame is provided with continuous support surfaces arranged to provide an abutment for the peripheral rims of the doors and a seal between themselves and the doors.

10 Claims, 5 Drawing Figures

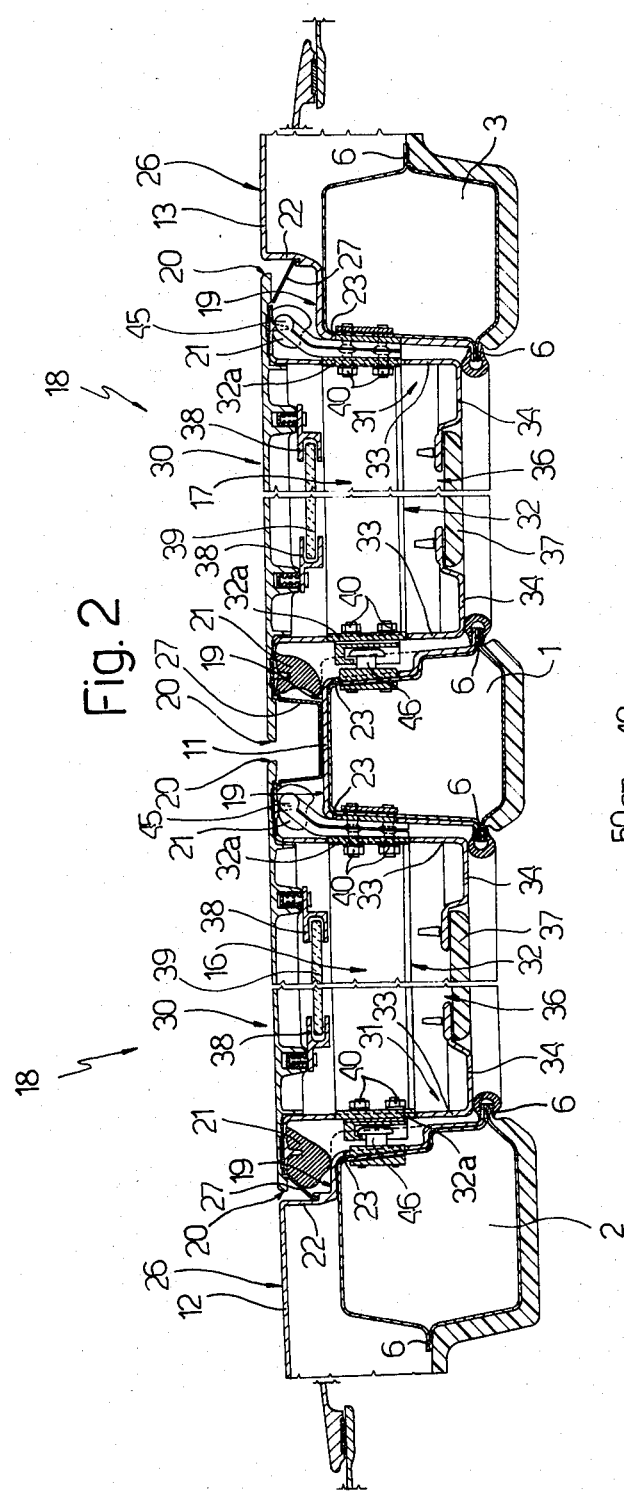
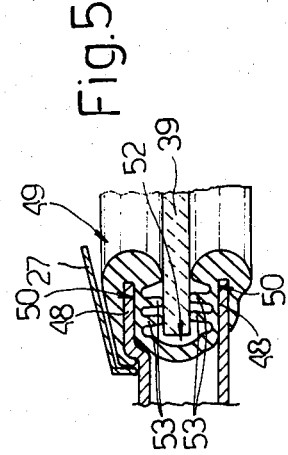

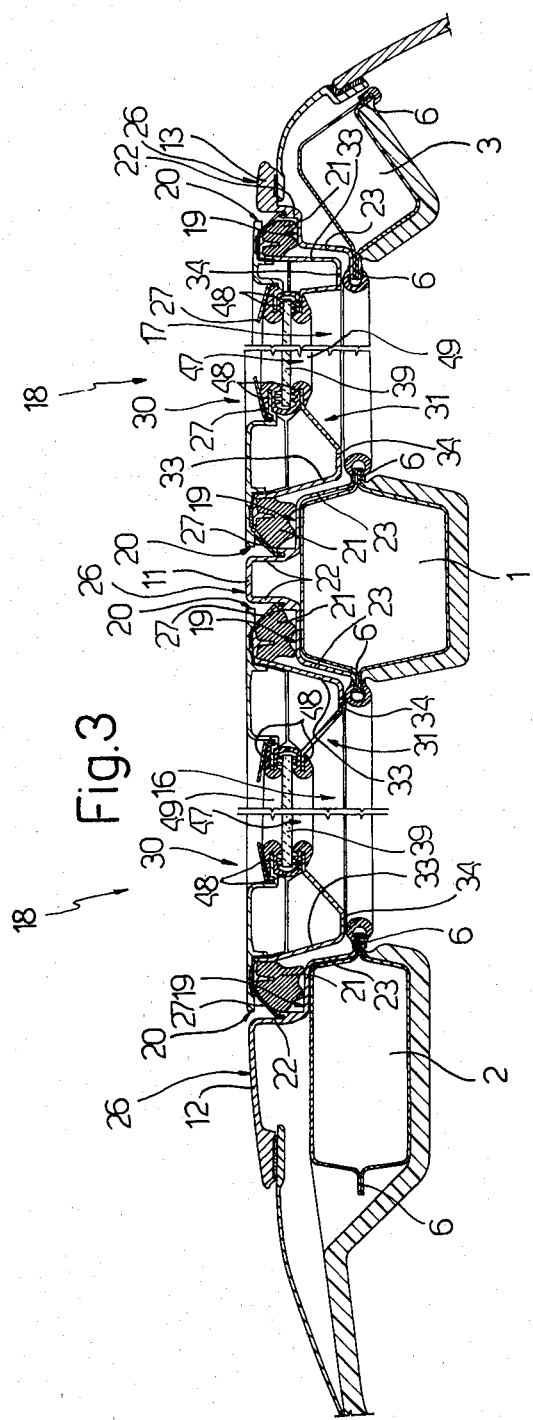

MOTOR VEHICLE DOOR ASSEMBLY

BACKGROUND OF THE INVENTION

The present invention relates to a door assembly for the side closure of the passenger compartment of a motor vehicle, arranged to be connected to the carrying structure of the vehicle. In particular, the door assembly according to the invention is apt to be utilized in combination with a carrying structure having a mechanical resistance function and provided with two sides, each of which comprises substantially at least three substantially vertical stanchions and two substantially horizontal side members connected to one another.

As is well-known, the doors of a motor vehicle, which normally are formed by a plurality of panel-shaped elements rigidly connected to each other by welding, are hinged to a stanchion of the body of the vehicle; usually, the seal between the door and the bodywork is obtained by interposing a gasket member between the rim portions of the door and the corresponding abutment surfaces of the bodywork.

However, the bodyworks provided with doors of the type described hereinabove give rise to some constructional problems.

First of all, each door, owing to the rather large dimensions of the panels of which it is made and the considerable deformability of these latter, can be constructed only with large dimensional and form tolerances, and therefore, when the door, after having been fixed to the respective stanchion of the bodywork, is brought to its closure position, it is hardly able to cooperate in a correct manner with the said abutment surfaces intended to provide a seal with the bodywork.

Therefore, in the course of the assembly of the door onto the bodywork it is necessary to carry out fitting operations on each door, so as to suitably deform it in order to allow a suitable coupling of the door with the respective abutment surfaces; such operations require rather long times and have to be carried out by operators having particular ability and experience.

In addition, each door has a rather complex structure and a high weight, due to the numerous component elements of which it is made and which exert simultaneously both the function of mechanical resistance and the function of closing and protecting the passenger compartment against the external environment.

SUMMARY OF THE INVENTION

The object of the present invention is to provide a door assembly for the side closure of the passenger compartment of a motor vehicle comprising a carrying structure having a mechanical resistance function and provided with two sides, each of which comprises at least three substantially vertical stanchions and two substantially horizontal side members connected to one another, which door assembly will allow avoiding the aforementioned disadvantages.

The door assembly of the present invention is characterized in comprising a frame having three substantially vertical stanchions and two substantially horizontal side members and arranged to be superimposed sideways on a corresponding side of the said carrying structure, the said frame being shaped in such a manner that the said stanchions and the said side members of the said frame are superimposable on corresponding stanchions and side members of the said side, each of the said frames being provided with continuous abutment surfaces formed on said stanchions and on said side members and apt to serve as a continuous abutment for the rims of the said doors when these latter are in their closure position; conveniently, said frame is made of plastics.

Furthermore, according to the present invention each door comprises at least a pair of panels made of plastics, between which there is disposed a support plate arranged to support the door window regulators, the said panels being connected to one another and at least one of them being connected to the said support plate, and the said support plate, in its turn, connected, by means of hinges, to one of the said stanchions.

BRIEF DESCRIPTION OF THE DRAWINGS

For a better understanding of the present invention, a particular embodiment thereof will now be described in detail, by way of non limiting example, with reference to the accompanying drawings, in which:

FIG. 2 is a partial horizontal section of the door assembly of the present invention, along the line II—II of FIG. 1;

FIG. 3 is a horizontal section, similar to that of FIG. 2, along the line III—III of FIG. 1;

FIG. 5 is an enlarged cross-sectional view of a sealing member which is part of the assembly shown in the preceding Figures.

DETAILED DESCRIPTION OF THE INVENTION

The door assembly of the present invention is fit for being utilized on any motor vehicle whose bodywork comprises a carrying structure having two sides, each of which comprises, in its turn, at least three substantially vertical stanchions and two substantially horizontal side members, to which the assembly of the present invention may be fixed in the way which will be described later.

In particular, the door assembly of the present invention is fit for being utilized in combination with a carrying structure having mechanical resistance function.

Figure 4:
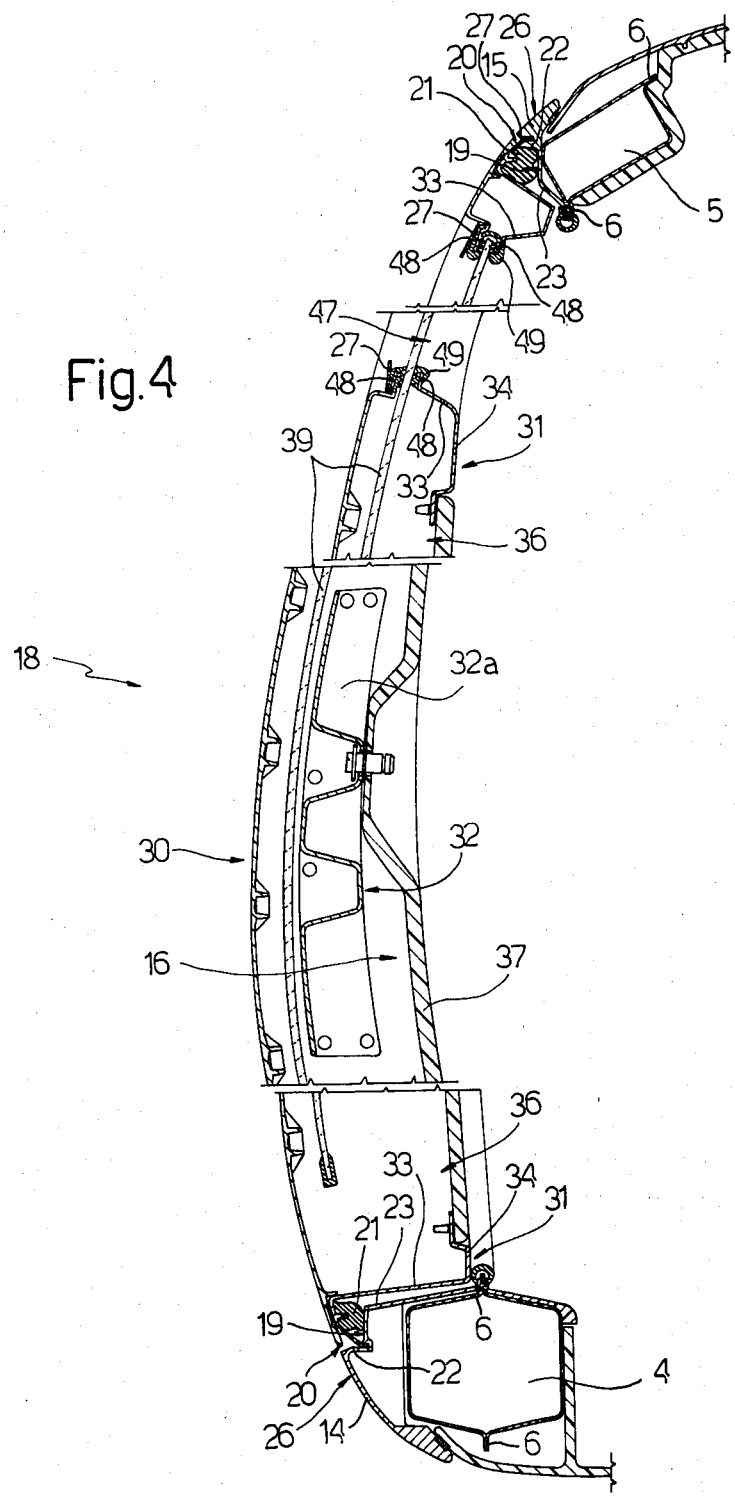
FIG. 4 is a vertical section through the door assembly of the present invention, along the line IV—IV of FIG. 2.

Each side of said carrying structure may comprise three stanchions 1, 2 and 3, visible in section in FIGS. 2 and 3, and a pair of lower and upper side members 4 and 5, respectively, shown in section in FIG. 4, rigidly connected to one another in any suitable manner.

The cross-sections of the stanchions and side members may be shaped in any desirable manner; in the embodiment shown in the drawings, each of them has a substantially box-type structure and is formed from two elements of drawn plate which are provided with continuous rims 6 arranged to be superimposed on and joined to one another, as can be seen in the said Figures.

The door assembly according to the present invention, even if it is particularly suitable to be fixed to a side of a carrying structure provided with stanchions and side members having the profile illustrated, may also be conveniently utilized on any bodywork having at least three vertical stanchions and two longitudinal side members arranged to allow the connection of the assembly in the way which will be described later.

The door assembly of the present invention comprises substantially a frame 10 which also is provided with three stanchions, i.e. a central stanchion 11 and two lateral stanchions 12 and 13, and with two side members, namely a lower side member 14 and an upper side member 15. The shape and dimensions of said frame are such as to allow the respective stanchions and side members to be superimposed on corresponding stanchions and side members of the respective side to which the door assembly of the present invention has to be applied; therefore, the shape of each stanchion 11, 12 and 13 and each side member 14, 15 must correspond to that of the respective stanchions 1, 2 and 3 and side members 4 and 5 of the said carrying structure of the vehicle.

Figure 1:
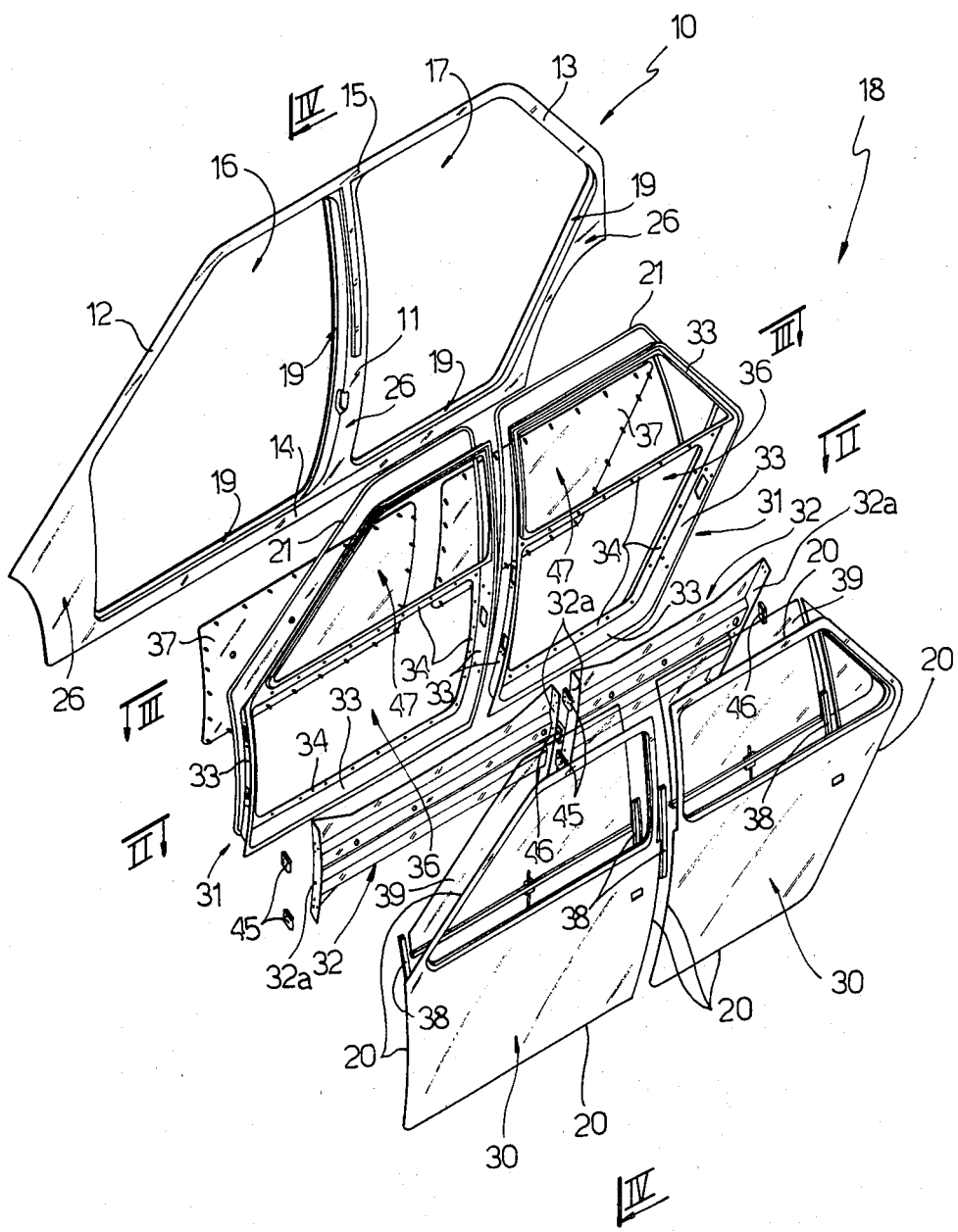
FIG. 1 is a perspective view, with disassembled elements, which is apt to illustrate the fundamental parts which form the door assembly according to the present invention.

Thus, the stanchions and side members of each frame define a pair of openings 16 and 17 (FIG. 1), each of which is arranged to receive a corresponding door indicated generally by reference numeral 18. Formed on the peripherally inner rim of each of said openings 16, 17 is a continuous support surface 19 (FIGS. 2 and 3) arranged to constitute an abutment for the peripherally outer rim 20 of each door 18; to this end, as clearly shown in FIGS. 2 and 3, between the said rim and the said abutment surface there is interposed a continuous element 21. The frame 10 comprises also a pair of surfaces adjacent the said continuous abutment surface 19, indicated by reference numerals 22 and 23 and clearly visible in section in FIG. 3; the said pair of surfaces are substantially orthogonal to the respective abutment surface 19 and project from opposed parts of the said surface 19, so as to form in cross-section a broken line profile. In this way, the continuous abutment surface 19 results in being slightly recessed relative to the outermost surfaces 26 (FIG. 3) of the frame 10.

Thus, as clearly shown in section in FIGS. 2 and 3, the central stanchion 11 of the frame 10 is substantially U-shaped and the walls to which the surfaces 19 and 23 pertain are superimposed on corresponding surfaces of the said stanchion.

In the embodiment shown, the walls to which the surfaces 22 and 26 (FIG. 3) of the stanchion 11 pertain generate, in the upper portion of the said stanchion a projection protruding from the stanchion itself, as can be clearly seen in the sectional view of FIG. 3; in the lower portion of the stanchion, instead, such projection is missing and is replaced by a substantially U-shaped section indicated by reference numeral 27 (FIG. 2).

Conveniently, the frame 10 is made of plastics and may be obtained from a slab of plastics by means of the usual slab forming technologies.

Each door substantially comprises a pair of panels, namely an outer panel 30 and an inner panel 31 (FIGS. 1, 2 and 3) between which there is disposed a support plate 32 having mechanical resistance function.

This support plate 32, which normally is made of steel and is apt to support the window regulator, the door lock and the door handle, substantially comprises a pair of tabs 32a (FIG. 1) arranged to allow to fasten, in the way which will be described later, the two panels to the said plate and the plate to the stanchion 1 or 3 of the carrying structure of the vehicle.

The inner panel 31 has a substantially box-type configuration, as clearly shown in the sectional view of FIG. 2, and accordingly it has continuous sidewalls 33 and a bottom wall 34; the contour of the outer panel 30 has dimensions larger than those of the panel 31, so as to form the peripheral rims 20 which project sideways relative to the sidewalls 33 of the inner panel 31, as clearly shown in FIGS. 2 and 3, and are apt to be superimposed, with the interposition of the sealing member 21, on the continuous abutment surfaces 19 of the frame 10.

The connection of the inner and outer panels 31, 30 respectively, may be carried out in any suitable manner, for example by glueing or welding the rims of the sidewalls 33 onto the inner surface of the outer panel 30. Conveniently, the bottom wall 34 of the panel 31 has an opening 36 closed by a plate of a suitable material. Suitable guides 38 for the glass 39 of the door may be connected to the outer panel 30.

The panel assembly 30, 31 is fixed to the support plate 32 in any convenient manner, for example by means of threaded connection members 40 arranged to be inserted into corresponding holes of the tabs 32a of the plate itself and into the sidewalls 33 of the inner panel 31; connection members of the same type may be used for fixing the said plate to hinges 45 and to locking members for locking the door 46 which are fastened to the stanchions 1, 2 and 3 of the carrying structure.

In order to improve the said connection between the panels 31 of each door, the hinges 45 and the locking members 46, into each sidewall 33 of the said panels there may be built-in a metal plaque having a suitable configuration.

Each panel 30 and 31 has an opening 47 (FIG. 1) whose continuous rims 48 (FIGS. 3 and 5) define the contour of the door window.

Each of these openings is provided with sealing elements for the glass 49 each of which has a pair of first grooves 50 (FIG. 5) arranged to be inserted into the continuous rims 48 of the opening 47 and a second groove 52 disposed between the said first grooves and arranged to receive the edge portion of the respective glass 39. Conveniently, on the inner surface of the second groove 52 there are formed projections 53 extending towards the surface of the glass 39 and capable of improving the seal between this latter and the sealing member.

As clearly shown in FIGS. 2 and 3, each sealing member 49, which may be formed from any deformable material, for example rubber or elastomer, not only provides the seal between the glass and the opening 47 of the door, but also constitutes a connection member between the inner panel 31 and the outer panel 30, in a point corresponding to the region of the said opening.

The door assembly described hereinabove is mounted onto the carrying structure of the motor vehicle by first connecting the frame 10 to a corresponding side of the carrying structure; this is obtained by superimposing the walls of the stanchions 11, 12 and 13 and of the side members 14 and 15 of the frame 10 on corresponding surfaces of the stanchions 1, 2 and 3 and of the side members 4 and 5 of the carrying structure, as can be clearly seen in FIGS. 2 and 3. Thereafter, each door is fastened to the respective stanchion by connecting the hinges 45 to the stanchion; at the end of this operation, the peripheral rims of each door are able to perfectly overlap the corresponding abutment surfaces 19 of the frame 10 to create a seal with them with the aid of the seal member 21; this correspondence, obtainable during the assembly, between the peripheral rims and the abutment surfaces derives from the small dimension and configuration tolerances which may be obtained during the construction of the frame 10 and the panels 30 and 31 of each door, as well as from the strict positioning which is possible to obtain between this latter and the frame.

It is clear also that each door is composed both of elements having the only function of mechanical resistance, such as the support plate 32, and of other elements having the only function of covering and closing the openings 16 and 17 of the frame 10, such as the panels 30 and 31; by this differentiation of the functions there are obtained doors having a high mechanical resistance and a very small weight. In addition, it is possible to provide units comprising the frame 10 and the two completely assembled doors, each unit being already fit for being mounted directly onto a side of the structure; it follows that the assembly time and, consequently, the assembly cost are a great deal reduced. The various parts of the assembly, which are all made of plastics except the plates 32 and the connection members, do not require any further finishing operations, nor particular treatments, except an eventual painting of these parts which has only a decorative function.

It is clear that many modifications and variations may be made to the described embodiment of the door assembly according to the present invention, as regards both the shape and the arrangement of the various parts, without departing from the scope of the invention.

I claim:

1. A door assembly for the side closure of the passenger compartment of a motor vehicle comprising a carrying structure having a mechanical resistance function and provided with at least two sides, each of which comprises at least three substantially vertical stanchions and two substantially horizontal side members connected to one another, a door being hinged to at least one of the said stanchions of the respective side, characterized in comprising a frame having three substantially vertical stanchions and two substantially horizontal side members and arranged to be superimposed sideways on a corresponding side of the said carrying structure, the configuration of the said frame being such that the said stanchions and the said side members of the said frame may be superimposed on the corresponding stanchions and side members of the said side, each of the said frames being provided with continuous abutment surfaces formed on the said stanchions and the said side members and arranged to provide a continuous abutment for the rims of a door when these latter are in their closure position.

2. A door assembly as claimed in claim 1, characterized in that sealing elements are interposed between the said abutment surfaces of said frame and the said rims of the doors.

3. A door assembly as claimed in claim 1, characterized in that the central of the said three stanchions has a substantially U-shaped cross-section, so as to mate with the corresponding stanchion of the side of the carrying structure.

4. A door assembly as claimed in claim 1, characterized in that each of the said frames comprises a pair of surfaces adjacent the said continuous abutment surface, each of the said adjacent surfaces of the pair of surfaces being substantially orthogonal to the respective abutment surface and projecting therefrom on the side opposed to that from which the other surface projects.

5. A door assembly as claimed in claim 1, characterized in that the said frame is made of plastics.

6. A door assembly as claimed in claim 1, characterized in that each door comprises at least a pair of panels made of plastics, namely an inner and outer panel in relation to the passenger compartment, between which panels there is disposed a support plate arranged to support the window regulator of the door, the said panels being connected to one another and at least one of them being connected to the said support plate, and the said support plate being arranged to be connected, by means of hinges, to one of the said stanchions and, by means of locking members of the door, to another stanchion.

7. A door assembly as claimed in claim 1, characterized in that the said inner panel has a substantially box-type configuration and is provided with substantially continuous side surfaces and the said outer panel is provided with continuous rims projecting sideways in relation to the corresponding rims of the said inner panel, the said continuous rims of the said outer panel being arranged to be superimposed on the said continuous abutment surfaces of the said frame.

8. A door assembly as claimed in claim 6, characterized in that each of the said support plates comprises at least a pair of tabs, each of which is arranged to be connected to a portion of the said continuous sidewall of the said inner panel.

9. A door assembly as claimed in claim 6, in which each of the said panels comprises an opening arranged to define the window of the door and having continuous rims, characterized in comprising seal elements for the glass of the said window, each of which seal elements is provided with a pair of first grooves arranged to receive at least a part of the said continuous rims of the said openings, and a second groove disposed between the said first grooves and arranged to receive the edge portion of the said glass, the said first grooves being open on the side opposed to that to which the second groove is open.

10. A door assembly as claimed in claim 9, characterized in that the said second groove is provided with parts which project towards the interior of the groove and are arranged to contact the surfaces of the glass to provide a seal therewith.

* * * * *